United States Patent
Sonobe (10) Patent No.: US 9,571,226 B2
(45) Date of Patent: Feb. 14, 2017

(54) WIRELESS TRANSMISSION DEVICE, WIRELESS TRANSMISSION SYSTEM, AND METHOD FOR CONTROLLING WIRELESS TRANSMISSION DEVICE

(75) Inventor: Satoshi Sonobe, Tokyo (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 14/119,417

(22) PCT Filed: May 15, 2012

(86) PCT No.: PCT/JP2012/003159
§ 371 (c)(1),
(2), (4) Date: Nov. 21, 2013

(87) PCT Pub. No.: WO2012/164840
PCT Pub. Date: Dec. 6, 2012

(65) Prior Publication Data
US 2014/0092854 A1 Apr. 3, 2014

(30) Foreign Application Priority Data
May 31, 2011 (JP) .................. 2011-122042

(51) Int. Cl.
H04L 1/00 (2006.01)
H04L 5/08 (2006.01)
H04L 5/14 (2006.01)

(52) U.S. Cl.
CPC ............. *H04L 1/0003* (2013.01); *H04L 5/08* (2013.01); *H04L 5/143* (2013.01)

(58) Field of Classification Search
CPC .................................................... H04L 1/0003
See application file for complete search history.

(56) References Cited

U.S. PATENT DOCUMENTS 5,506,844 A * 4/1996 Rao .................. H04J 3/1688
370/468

6,618,450 B1 9/2003 Hatta
(Continued)

FOREIGN PATENT DOCUMENTS

CN      1656846 A    8/2005
CN      1960519 A    5/2007
(Continued)

OTHER PUBLICATIONS

Extended European Search Report issued by the European Patent Office for Application No. 12792751.5 dated Oct. 14, 2014 (7 pages).
(Continued)

*Primary Examiner* — Mohamed Kamara
*Assistant Examiner* — Thad Defauw
(74) *Attorney, Agent, or Firm* — Wilmer Cutler Pickering Hale and Dorr LLP (57) ABSTRACT

In order to improve efficiency of data transmission in a wireless transmission band under a condition in which both adaptive modulation scheme and FDD scheme are employed, and fixed rate signals and a variable rate signal are multiplex-transmitted, one wireless transmission device (2_1) multiplexes a plurality of fixed rate signals (FS1_1 to n) and a variable rate signal (VS2) to generate a frame (FR1), and sends the frame (FR1) to another wireless transmission device (2_2) through a wireless transmission path (CH1). At this time, the device (2_1) includes, in the frame (FR1), information (MN) relating to a number of multiplexed fixed rate signals. The device (2_2) multiplexes a plurality of fixed rate signals (FS3_1 to n) and a variable rate signal (VS3) to generate a frame (FR2), and sends the frame (FR2) to the device (2_1) through a wireless transmission path (CH2) having a different frequency. At this time, the device (2_2) determines a number of multiplexed fixed rate signals in the frame (FR2) according to the information (MN).

7 Claims, 8 Drawing Sheets

(56) References Cited

U.S. PATENT DOCUMENTS

| | | | |
|---|---|---|---|
| 2002/0075869 A1* | 6/2002 | Shah | H04Q 11/0071 370/389 |
| 2004/0081081 A1* | 4/2004 | Colombo | H04L 1/22 370/216 |
| 2008/0259901 A1* | 10/2008 | Friedman | H04J 3/1605 370/349 |
| 2009/0238134 A1 | 9/2009 | Shiizaki et al. | |

FOREIGN PATENT DOCUMENTS

| | | |
|---|---|---|
| EP | 1411745 A1 | 4/2004 |
| EP | 1983668 A2 | 10/2008 |
| EP | 2104258 | 9/2009 |
| JP | 2000-165462 | 6/2000 |
| JP | 2002-064822 | 2/2002 |
| JP | 2006-217663 | 8/2006 |
| JP | 2007-037029 | 2/2007 |
| JP | 2009-225343 | 10/2009 |
| JP | 2010-171542 | 8/2010 |
| WO | WO-97/18643 A1 | 5/1997 |

OTHER PUBLICATIONS

Russian Office Action issued by the Patent Office of the Russian Federation for Application No. 2013157816 dated Jan. 22, 2015 with English Translation (11 pages).
Chinese Office Action corresponding to Chinese Application No. 201280026235.7, dated Jan. 4, 2016, 17 pages.
International Search Report corresponding to PCT/JP2012/003159, dated Aug. 7, 2012, 5 pages.

* cited by examiner

Fig. 8

WIRELESS TRANSMISSION DEVICE, WIRELESS TRANSMISSION SYSTEM, AND METHOD FOR CONTROLLING WIRELESS TRANSMISSION DEVICE

CROSS-REFERENCE TO RELATED APPLICATIONS

This application is a national stage application of International Application No. PCT/JP2012/003159, entitled "Wireless Transmission Device, Wireless Transmission System, and Method for Controlling Wireless Transmission Device," filed on May 15, 2012, which claims the benefit of the priority of Japanese patent application No. 2011-122042, filed on May 31, 2011, the disclosures of each of which are hereby incorporated by reference in their entirety.

TECHNICAL FIELD

The present invention relates to a wireless transmission device, a wireless transmission system, and a method for controlling a wireless transmission device, and in particular, to a technique for multiplexing fixed rate signals and a variable rate signal in one wireless transmission band for transmission.

BACKGROUND ART

FWA (Fixed Wireless Access) system is well known as a wireless transmission system employing the above transmission technique. The FWA system is generally composed of two opposing wireless transmission devices and capable of providing a communication service between two distant points (e.g., between a subscriber located at an isolated island and a subscriber located at a mountainous area) without laying cables and the like.

To each wireless transmission device, fixed rate data signals (hereinafter may be referred to as fixed rate signals) as the one specified in ITU-T (International Telecommunication Union Telecommunication Standardization Sector) G.703, for example, are input in parallel, and a variable rate data signal (hereinafter may be referred to as a variable rate signal) as in Ethernet (registered trademark) is also input. Each wireless transmission device multiplexes a variable rate signal and a plurality of fixed rate signals, and transmits the multiplexed signal to an opposing device through one wireless transmission path.

Incidentally, in recent years, the adaptive modulation scheme is often employed by wireless transmission devices. This is because that the adaptive modulation scheme enables both maximization of transmission capacity and securing of minimum transmission capacity according to a state of a wireless transmission path.

Moreover, in many cases, the FDD (Frequency Division Duplex) scheme is used together by wireless transmission devices. In the FDD scheme, different frequencies are used for an uplink wireless transmission path and a downlink wireless transmission path, and it is common that wireless transmission path characteristics are different in the uplink wireless transmission path and the downlink wireless transmission path.

For this reason, a wireless transmission device employing both of the adaptive modulation scheme and the FDD scheme may select different modulation schemes for an uplink wireless transmission path and a downlink wireless transmission path. In such a case, there has been a problem that, in a symmetric transmission path, symmetric property between the uplink wireless transmission path and the downlink wireless transmission path cannot be retained, and in an asymmetric transmission path, a desired transmission ratio cannot be maintained.

As a technique to address this problem, Patent Literature 1, for example, discloses a method capable of using the same modulation scheme in the opposing wireless transmission devices at all times. To be more specific, in Patent Literature 1, when modulation scheme differs between wireless transmission devices due to a difference in characteristics of an uplink wireless transmission path and a downlink wireless transmission path, control is performed such that the modulation scheme is changed to a direction with a lower multiple value.

CITATION LIST

Patent Literature

Patent Literature 1: Japanese Unexamined Patent Application Publication No. 2006-217663
Patent Literature 2: Japanese Unexamined Patent Application Publication No. 2010-171542

SUMMARY OF INVENTION

Technical Problem

However, the present inventor has found out that above Patent Literature 1 has a problem in which efficiency of data transmission in a wireless transmission band has not improved. This is because the modulation scheme is changed to a direction with a lower multiple value, consequently disabling selection of the modulation scheme to achieve the maximum transmission capacity. In other words, above Patent Literature 1 compromises the advantages of the adaptive modulation scheme (i.e., achieving both maximization of transmission capacity and securing minimum transmission capacity).

On the other hand, the present inventor has found another problem that, in a wireless transmission system like FWA system, when modulation scheme differs between wireless transmission devices, the number of fixed rate signals that can be multiplexed in a wireless transmission band will be asymmetric, consequently reducing efficiency of data transmission in the wireless transmission band. When one wireless transmission device multiplexes more fixed rate signals than another wireless transmission device, the other wireless transmission device could receive redundant fixed rate signals. However, the redundant fixed rate signals are not processed but are discarded. This is because that the other wireless transmission device is unable to secure a band for sending response signals (which are also fixed rate signals) to the redundant fixed rate signals. In other words, one wireless transmission device multiplexes redundant fixed rate signals in the wireless transmission band.

Note that as a related technique, Patent Literature 2 discloses a system that connects wireless transmission devices via a main wireless transmission path and a standby wireless transmission path, and employs different modulation schemes for the transmission paths to transmit fixed rate signals through the transmission paths. However, the technique disclosed in Patent Literature 2 uses redundant wireless resources, running counter to the improvement in efficiency of data transmission.

Accordingly, an object of the present invention is to improve efficiency of data transmission in a wireless transmission band under a condition in which both adaptive modulation scheme and FDD scheme are employed, and fixed rate signals and a variable rate signal are multiplex-transmitted.

Solution to Problem

In order to achieve the above object, a first exemplary aspect of the present invention is a wireless transmission device that includes: communication means employing an adaptive modulation scheme for sending a first frame to an opposing device through a first wireless transmission path, and receiving a second frame from the opposing device through a second wireless transmission path, the second wireless transmission path having a frequency different from the first wireless transmission path; and multiplex means for multiplexing a plurality of first data signals and a second data signal to generate the first frame, the first data signals being input in parallel at a fixed rate, and the second data signal being input at a variable rate. The multiplex means includes, in the first frame, information relating to a number of multiplexed first data signals.

A second exemplary aspect of the present invention is a wireless transmission device that includes: communication means employing an adaptive modulation scheme for receiving a first frame from an opposing device through a first wireless transmission path, and sending a second frame to the opposing device through a second wireless transmission path, the second wireless transmission path having a frequency different from the first wireless transmission path; separation means for separating, from the first frame, a plurality of first data signals, a second data signal, and information relating to a number of multiplexed first data signals, the first data signals being input in parallel to the opposing device at a fixed rate, and the second data signal being input to the opposing device at a variable rate; and multiplex means for multiplexing a plurality of third data signals and a fourth data signal to generate the second frame, the third data signals being input in parallel to the wireless transmission device at a fixed rate, and the fourth data signal being input to the wireless transmission device at a variable rate. The multiplex means determines a number of multiplexed third data signals according to the number of multiplexed first data signals.

A third exemplary aspect of the present invention is a wireless transmission system that includes: a first wireless transmission device employing an adaptive modulation scheme that sends a first frame through a first wireless transmission path and receives a second frame through a second wireless transmission path, the second wireless transmission path having a frequency different from the first wireless transmission path; and a second wireless transmission device employing the adaptive modulation scheme that receives the first frame from the first wireless transmission device through the first wireless transmission path and transmits the second frame to the first wireless transmission device through the second wireless transmission path. The first wireless transmission device is configured to: multiplexes a plurality of first data signals and a second data signal to generate the first frame, the first data signals being input in parallel to the first wireless transmission device at a fixed rate, and the second data signal being input to the first wireless transmission device at a variable rate; and include, in the first frame, information relating to a number of multiplexed first data signals. The second wireless transmission device is configured to: separate, from the first frame, the first data signals, the second data signal, and the information relating to the number of multiplexed first data signals; multiplex a plurality of third data signals and a fourth data signal to generate the second frame, the third data signals being input in parallel to the second wireless transmission device at a fixed rate, and the fourth data signal being input to the second wireless transmission device at a variable rate; and determine a number of multiplexed third data signals according to the number of multiplexed first data signals.

A fourth exemplary aspect of the present invention is a method for controlling a wireless transmission device employing an adaptive modulation scheme that sends a first frame to an opposing device through a first wireless transmission path and receives a second frame from the opposing device through a second wireless transmission path, the second wireless transmission path having a frequency different from the first wireless transmission path. The method includes: multiplexing a plurality of first data signals and a second data signal to generate the first frame, the first data signals being input in parallel at a fixed rate, and the second data signal being input at a variable rate; and including, in the first frame, information relating to a number of multiplexed first data signals.

A fifth exemplary aspect of the present invention is a method for controlling a wireless transmission device employing an adaptive modulation scheme that receives a first frame from an opposing device through a first wireless transmission path and transmits a second frame to the opposing device through a second wireless transmission path, the second wireless transmission path having a frequency different from the first wireless transmission path. The method includes: separating, from the first frame, a plurality of first data signals, a second signal, and information relating to a number of multiplexed first data signals, the first data signals being input in parallel to the opposing device at a fixed rate, and the second data signal being input to the opposing device at a variable rate; multiplexing a plurality of third data signals and a fourth data signal to generate the second frame, the third data signals being input in parallel to the wireless transmission device at a fixed rate, and the fourth data signal being input to the wireless transmission device at a variable rate; and determining a number of multiplexed third data signals according to the number of multiplexed first data signals.

Advantageous Effects of Invention

According to the present invention, it is possible to improve efficiency of data transmission in a wireless transmission band under a condition in which both adaptive modulation scheme and FDD scheme are employed, and fixed rate signals and a variable rate signal are multiplex-transmitted.

DESCRIPTION OF EMBODIMENTS

Hereinafter, first and second exemplary embodiments of a wireless transmission device according to the present invention and a wireless transmission system to which the wireless transmission device is applied will be explained with reference to FIGS. 1 to 8. Note that in the drawings, identical or similar components are denoted by identical or similar reference codes, and repeated explanation will not be provided as appropriate for clarity of explanation.

First Exemplary Embodiment

Figure 1:
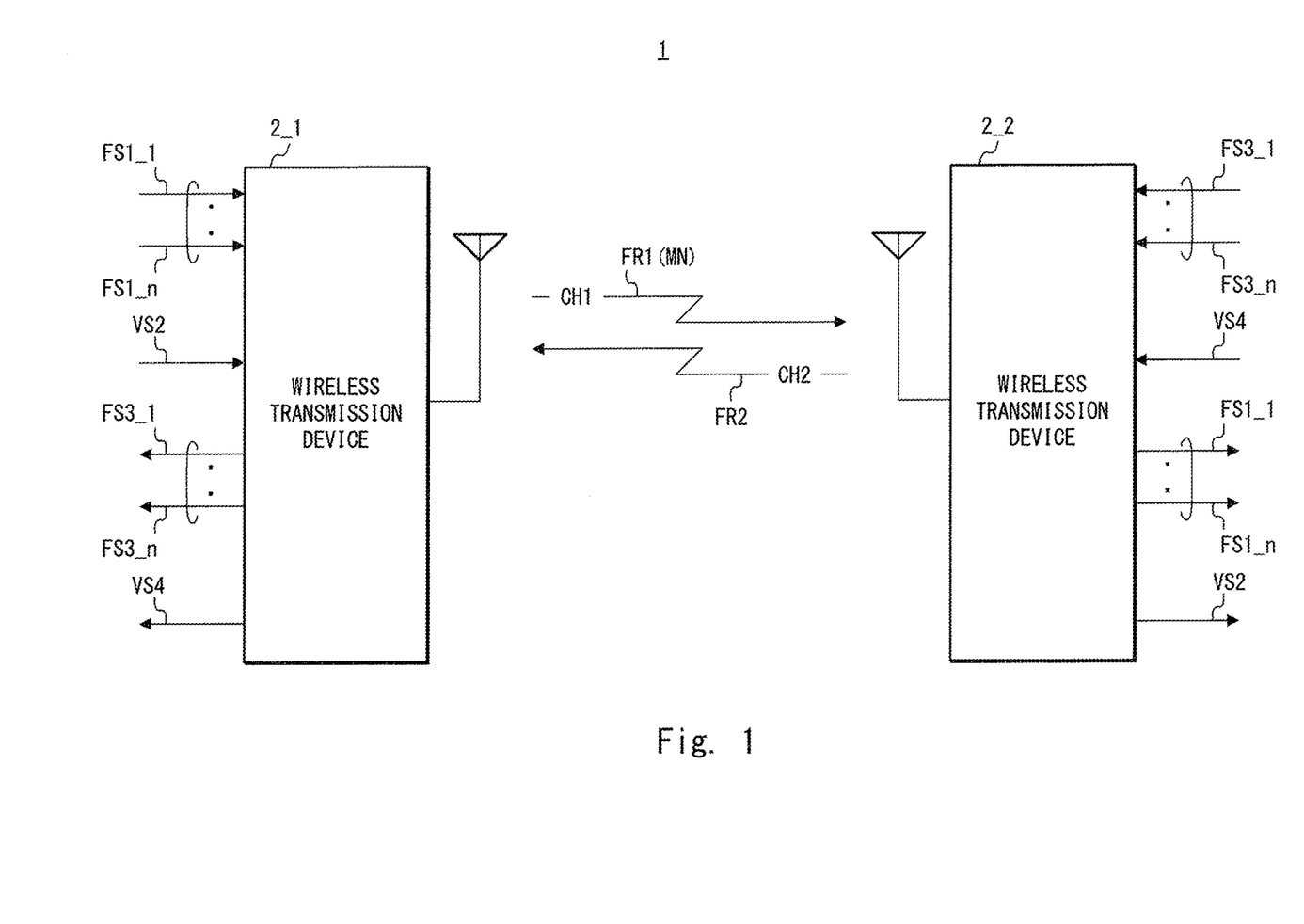
FIG. 1 is a block diagram showing a configuration example of a wireless transmission system according to a first exemplary embodiment of the present invention.

As shown in FIG. 1, a wireless transmission system 1 according to this exemplary embodiment includes two opposing wireless transmission devices 2_1 and 2_2 (hereinafter may be collectively referred to by a code 2). The wireless transmission devices 2 employ adaptive modulation scheme. Moreover, the wireless transmission devices 2 also employ FDD scheme.

Among them, to the wireless transmission device 2_1 from outside, a plurality of fixed rate signals FS1_1 to FS1_$n$ (n is an integer of 2 or greater) are input in parallel and a variable rate signal VS2 is input. The wireless transmission device 2_1 multiplexes some fixed rate signals and a variable rate signal to generate a wireless frame FR1.

Figure 2:
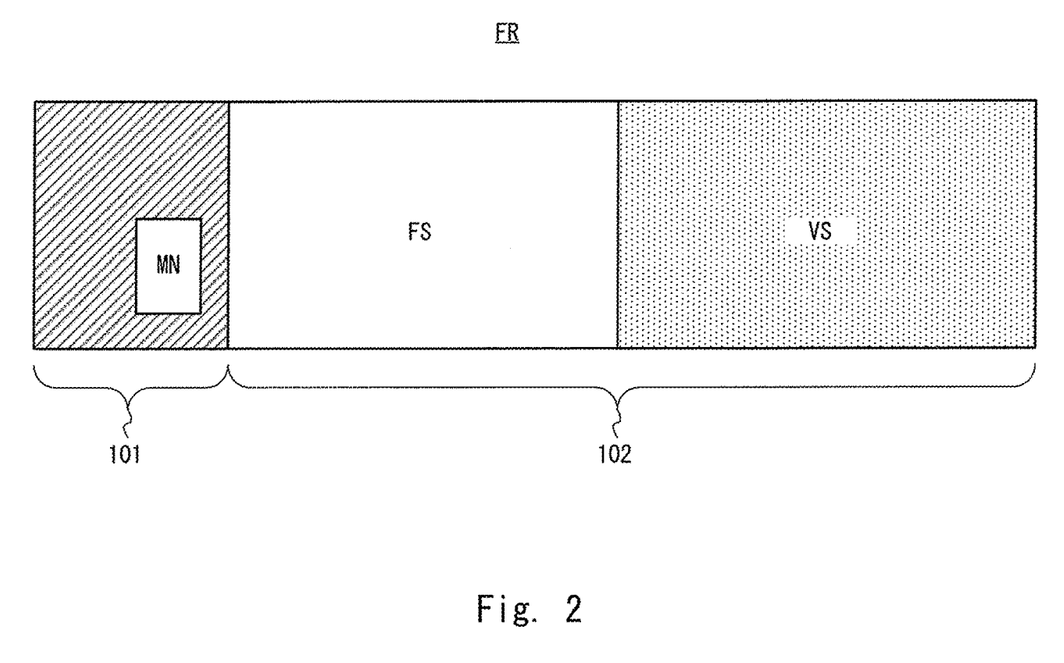
FIG. 2 is a configuration example of a frame used in the wireless transmission system according to the first exemplary embodiment of the present invention.

At this time, the wireless transmission device 2_1 includes, in the frame FR1, information MN relating to the number of multiplexed fixed rate signals (the information MN may be hereinafter referred to as multiplex number information). The multiplex number information MN indicates the number of fixed rate signals multiplexed in a frame. The frame may be configured as shown in FIG. 2, for example. A frame FR shown in FIG. 2 includes an overhead region 101 and a payload region 102. In this case, the wireless transmission device 2_1 sets the multiplex number information MN to, for example, a reserve region in the overhead region 101. Moreover, the wireless transmission device 2_1 sets fixed rate signals FS and a variable rate signal VS to the payload area 102.

Then, the wireless transmission device 2_1 sends the frame FR1 to the wireless transmission device 2_2 through a wireless transmission path CH1.

On the other hand, when the wireless transmission device 2_2 receives the frame FR1, the wireless transmission device 2_2 separates the fixed rate signals, the variable rate signal, and the multiplex number information MN from the frame FR1. The wireless transmission device 2_2 outputs, to outside, the fixed rate signals FS1_1 to FS1_$n$ and the variable rate signal VS2 that are obtained in the separation.

To the wireless transmission device 2_2 from outside, a plurality of fixed rate signals FS3_1 to FS3_$n$ are input in parallel and a variable rate signal VS4 is input. Note that the number "n" of fixed rate signals that are input to the wireless transmission devices 2_1 and 2_2 may be different from each other. The wireless transmission device 2_2 multiplexes some fixed rate signals and a variable rate signal to generate a wireless frame FR2.

At this time, the wireless transmission device 2_2 determines the number of multiplexed fixed rate signals in the frame FR2 according to the multiplex number information MN. To be more specific, the wireless transmission device 2_2 reduces or increases the number of fixed rate signals multiplexed in the frame FR2 to be equalized to the number of fixed rate signals multiplexed in the frame FR1.

Then, the wireless transmission device 2_2 sends the frame FR2 to the wireless transmission device 2_1 through a wireless transmission path CH2 to which a frequency different from that of CH1 is applied.

When the wireless transmission device 2_1 receives the frame FR2, the wireless transmission device 2_1 separates the fixed rate signals and the variable rate signal from the frame FR2. The wireless transmission device 2_1 outputs, to outside, the fixed rate signals FS3_1 to FS3_$n$ and the variable rate signal VS4 that are obtained in the separation.

As described above, in this exemplary embodiment, one wireless transmission device indicates the number of multiplexed fixed rate signals, and another wireless transmission device adjusts the number of multiplexed fixed rate signals according to this indication.

Therefore, even when the modulation scheme differs between the wireless transmission devices due to a difference in characteristics between an uplink wireless transmission path and a downlink wireless transmission path, it is possible to make adjustment such that the number of multiplexed fixed rate signals is symmetrical between the wireless transmission devices. In other words, it is possible to avoid a situation such that a redundant fixed rate signal is multiplexed in a wireless transmission band by one wireless transmission device and discarded by the other wireless transmission device.

Further, in this exemplary embodiment, different modulation schemes may be applied to an uplink wireless transmission path and a downlink wireless transmission path, thereby not compromising the advantages of the adaptive modulation scheme unlike above Patent Literature 1.

Hence, according to this exemplary embodiment, it is possible to greatly improve efficiency of data transmission than in related techniques, under a condition in which both the adaptive modulation scheme and the FDD scheme are employed, and fixed rate signals and a variable rate signal are multiplex-transmitted. Note that it is not essential to equalize the number of multiplexed fixed rate signals between the wireless transmission devices. This is because that the closer the numbers of multiplexed fixed rate signals between the wireless transmission devices, the less the redundant usage of wireless transmission band.

Hereinafter, specific configuration example and operation example of the wireless transmission device 2 which achieve the above-mentioned operation will be explained in detail with reference to FIGS. 3 to 7.

Figure 3:
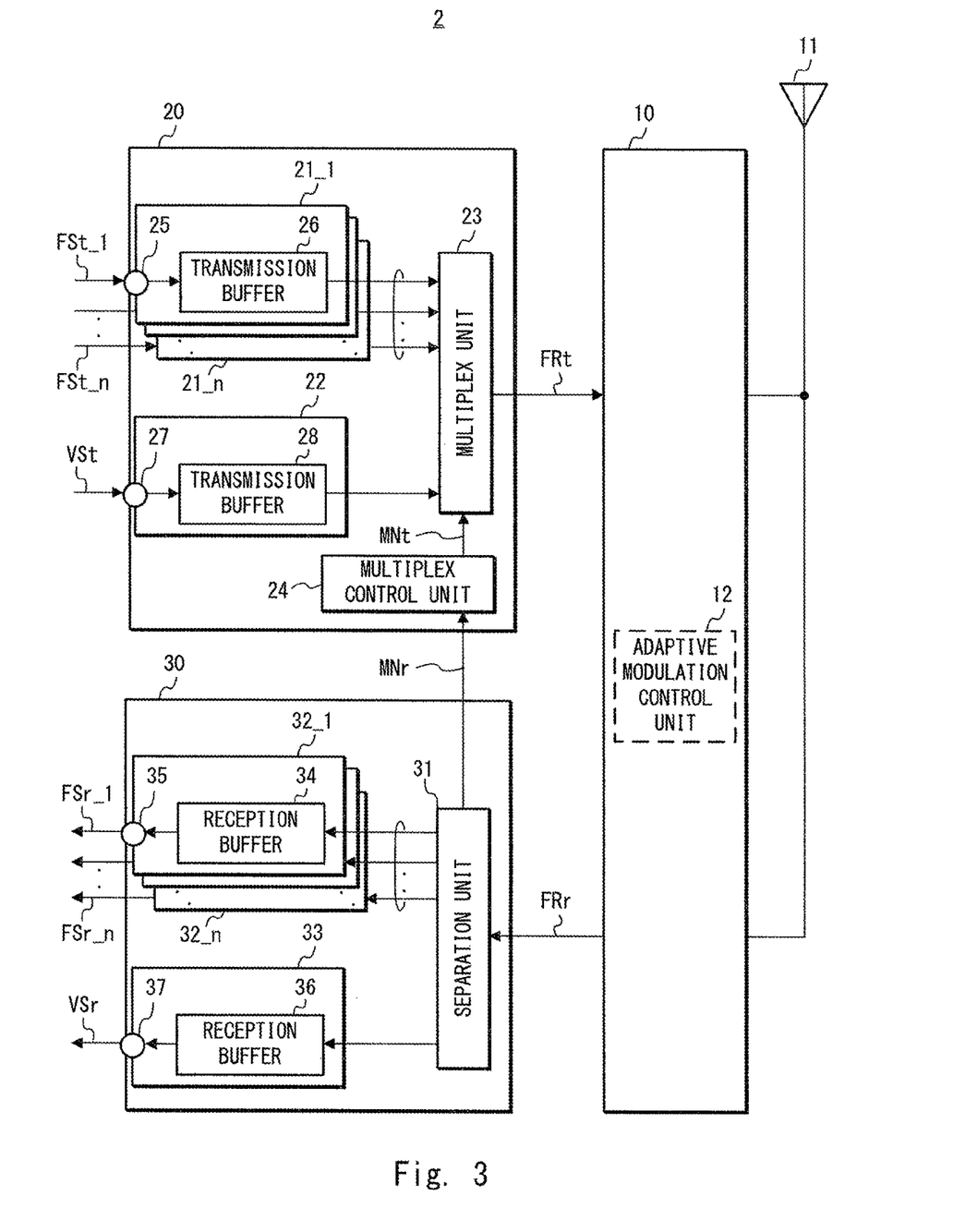
FIG. 3 is a block diagram showing a configuration example of a wireless transmission device according to the first exemplary embodiment of the present invention.

As shown in FIG. 3, the wireless transmission device 2 includes a wireless communication unit 10, a wireless frame multiplex unit 20, and a wireless frame separation unit 30.

Among them, the wireless communication unit 10 performs processing, such as modulation processing, DA (Digital to Analog) conversion and frequency conversion, for a transmission frame FRt input from the wireless frame multiplex unit 20, thereby outputting the transmission frame FRt as a wireless signal via an antenna 11. Moreover, the wireless communication unit 10 performs processing, such as frequency conversion, AD (Analog to Digital) conversion and demodulation processing, for a wireless signal received via the antenna 11, and outputs a reception frame FRr obtained accordingly to the wireless frame separation unit 30. Further, the wireless communication unit 10 includes an adaptive modulation control unit 12, as indicated by the dotted line in FIG. 3. The adaptive modulation control unit 12 performs control to select a modulation scheme and a demodulation scheme according to a state of a wireless transmission path. To be more specific, the adaptive modulation control unit 12 calculates transmission quality of the wireless transmission path that fluctuates due to, for example, an influence of waveform attenuation by rain and multipath fading, and dynamically changes a modulation scheme and a demodulation scheme according to the transmission quality.

The wireless frame multiplex unit 20 includes "n" units of fixed rate signal input units 21_1 to 21_n, a variable rate signal input unit 22, a multiplex unit 23, and a multiplex control unit 24.

Each of the fixed rate signal input units 21_1 to 21_n includes an input terminal 25 and a transmission buffer 26. Each of "n" units of transmission fixed rate signals FSt_1 to FSt_n (hereinafter may be collectively referred to by a code FSt) is stored to the transmission buffer 26 through the input terminal 25.

The variable rate signal input unit 22 includes an input terminal 27 and a transmission buffer 28. A transmission variable rate signal VSt is stored to the transmission buffer 28 through the input terminal 27.

The multiplex unit 23 multiplexes the fixed rate signals FSt and the variable rate signal VSt in the frame FRt according to transmission multiplex number information MNt that is input from the multiplex control unit 24, and outputs the frame FRt to the wireless communication unit 10. At this time, the multiplex unit 23 calculates transmission capacity of signals (a length of the payload region 102 shown in FIG. 2) according to the modulation scheme selected by the wireless communication unit 10. Moreover, the multiplex unit 23 reads out, from the transmission buffers 26 in the fixed rate signal input units 21_1 to 21_n, the fixed rate signals FSt for the number indicated by the multiplex number information MNt in, for example, ascending or descending order of signal numbers "1" to "n", and sets the fixed rate signals FSt to a part of the payload region 102. Further, the multiplex unit 23 reads out the variable rate signal VSt from the transmission buffer 28 in the variable rate signal input unit 22, and sets the variable rate signal VSt to the remaining payload region 102. Furthermore, the multiplex unit 23 sets the multiplex number information MNt to the overhead region 101.

The multiplex control unit 24 determines the transmission multiplex number information MNt according to reception multiplex number information MNr that is input from the wireless frame separation unit 30. The reception multiplex number information MNr is set by an opposing device and indicates the number of fixed rate signals multiplexed in the reception frame FRr. The multiplex control unit 24 equalizes the number of fixed rate signals to be multiplexed in the transmission frame FRt to the number of fixed rate signals multiplexed in the reception frame FRr. Moreover, the multiplex control unit 24 outputs, to the multiplex unit 23, the equalized number as the transmission multiplex number information MNt.

The wireless frame separation unit 30 includes a separation unit 31, "n" units of fixed rate signal output units 32_1 to 32_n, and a variable rate signal output unit 33.

The separation unit 31 extracts, from the reception frame FRr, reception fixed rate signals FSr_1 to FSr_n (hereinafter may be collectively referred to by a code FSr), a reception variable rate signal VSr, and the reception multiplex number information MNr. At this time, the separation unit 31 outputs the reception fixed rate signals FSr_1 to FSr_n to the fixed rate signal output units 32_1 to 32_n, respectively. Further, the separation unit 31 outputs the reception variable rate signal VSr to the variable rate signal output unit 33. Furthermore, the separation unit 31 outputs the reception multiplex number information MNr to the multiplex control unit 24 in the wireless frame multiplex unit 20.

Each of the fixed rate signal output units 32_1 to 32_n includes a reception buffer 34 and an output terminal 35. Each of the reception fixed rate signals FSr_1 to FSr_n is stored to the reception buffer 34 once, and then output to outside through the output terminal 35.

The variable rate signal output unit 33 includes a reception buffer 36 and an output terminal 37. The reception variable rate signal VSr is stored to the reception buffer 36 once, and then output to outside through the output terminal 37.

Next, the specific operation example of the wireless transmission device 2 will be explained with reference to FIGS. 4 to 7.

Figure 4:
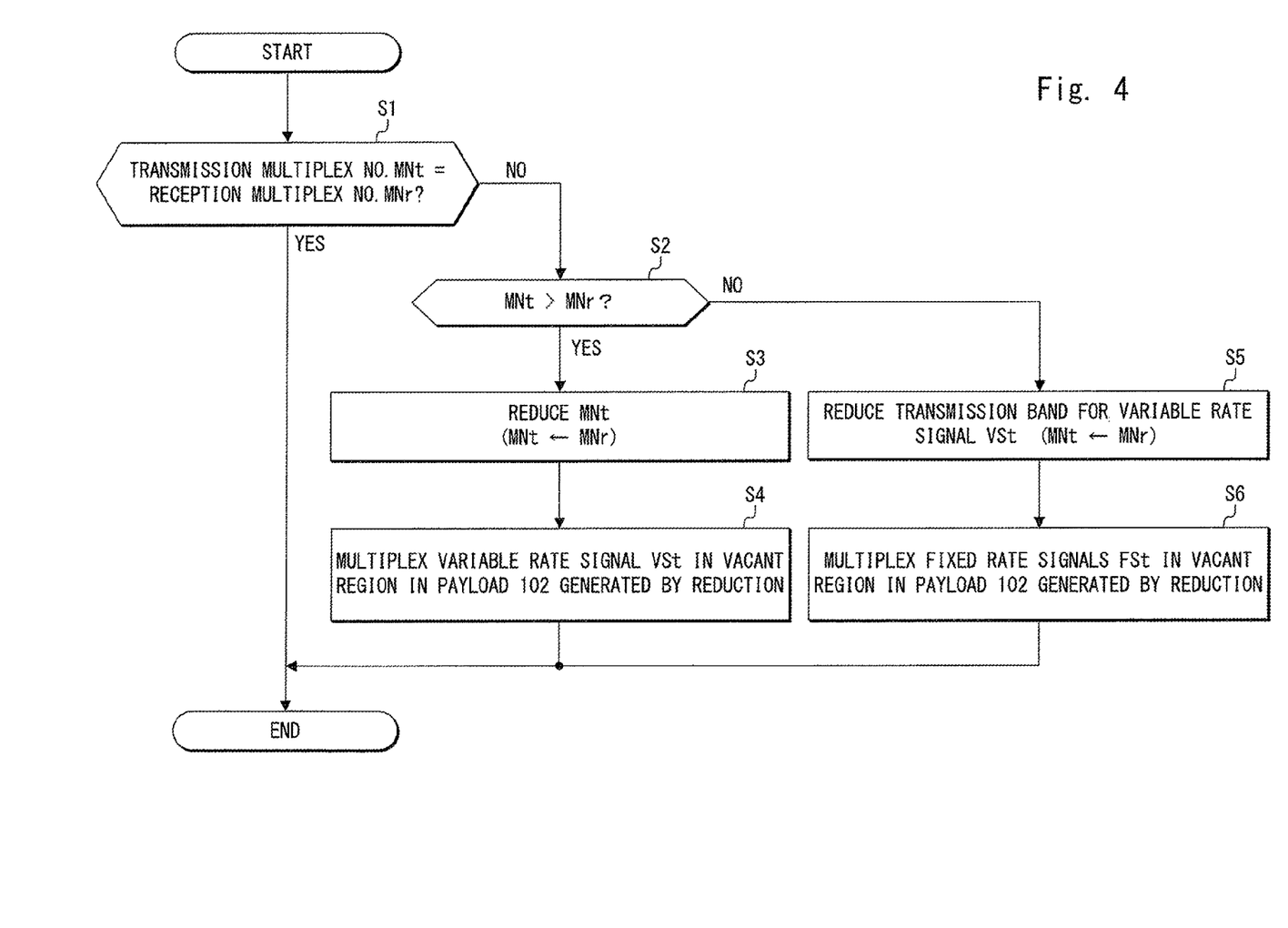
FIG. 4 is a flowchart showing an operation example of the wireless transmission device according to the first exemplary embodiment of the present invention.

As shown in FIG. 4, the multiplex control unit 24 in the wireless transmission device 2 compares the number indicated by the transmission multiplex number information MNt (the current number of fixed rate signals multiplexed in the transmission frame FRt) and the number indicated by the reception multiplex number information MNr every time the reception multiplex number information MNr is extracted by the separation unit 31. Note that in the subsequent explanation, the number indicated by the transmission multiplex number information MNt may be referred to as a transmission multiplex number and may be referred by the same code MNt. Similarly, the number indicated by the reception multiplex number information MNr may be referred to as a reception multiplex number and may be referred by the same code MNr.

As a result, when "the transmission multiplex number MNt=the receiving multiplex number MNr" is satisfied (Step S1), the multiplex control unit 24 does not change the transmission multiplex number MNt.

Figure 5:
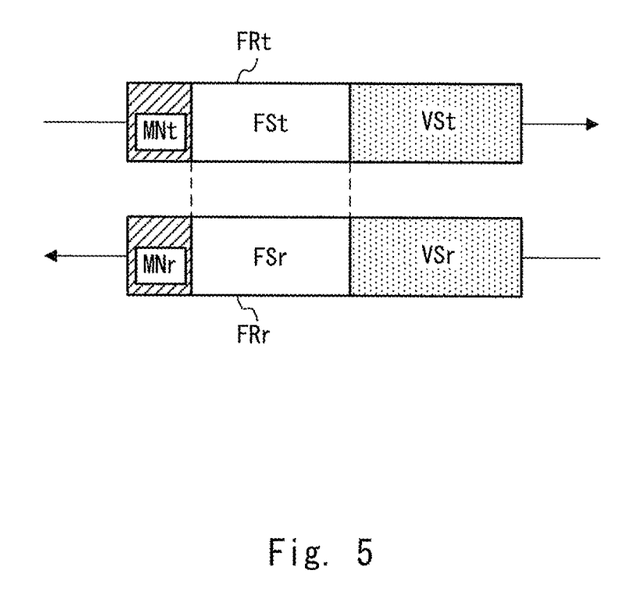
FIG. 5 is a first data transmission example in the wireless transmission device according to the first exemplary embodiment of the present invention.

Thus, as shown in FIG. 5, the state is maintained in which the number of the fixed rate signals FSt multiplexed in the transmission frame FRt is equalized to the number of the fixed rate signals FSr multiplexed in the reception frame FRr.

Meanwhile, when the modulation scheme of the wireless transmission device 2 and the opposing device is not the same, consequently satisfying "the transmission multiplex number MNt>the reception multiplex number MNr" (Step S2), processing indicated by Steps S3 and S4 is executed by cooperation of the multiplex control unit 24 and the multiplex unit 23.

Figure 6:
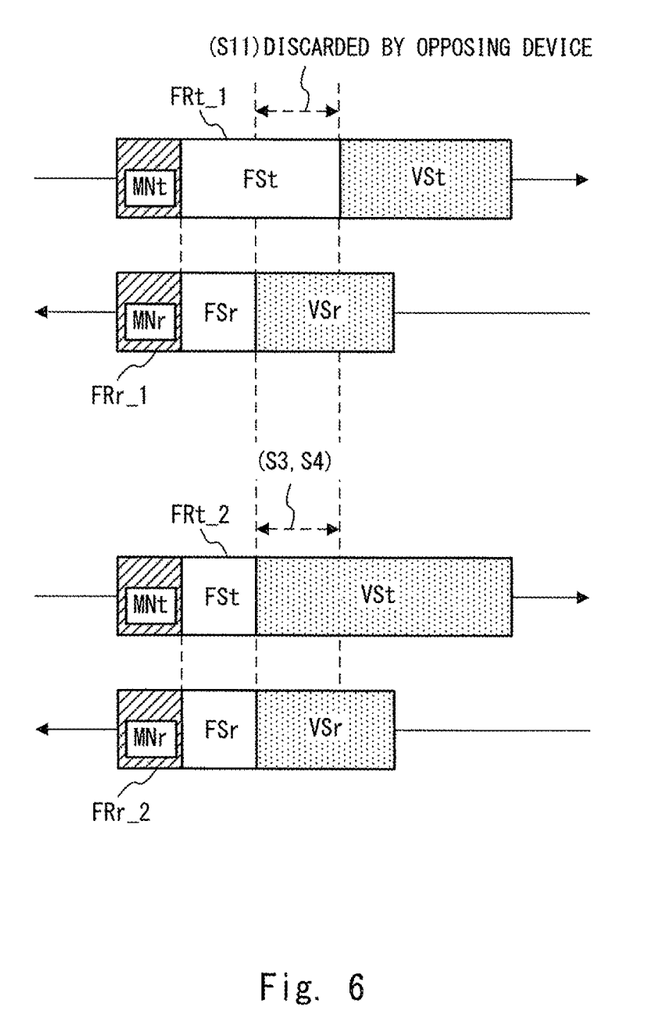
FIG. 6 is a second data transmission example in the wireless transmission device according to the first exemplary embodiment of the present invention.

Assume that as shown in FIG. 6, the wireless transmission device 2 sends a frame FRt_1 and receives a frame FRr_1 at a certain timing. Further, assume that more fixed rate signals FSt are multiplexed in the transmission frame FRt_1 than fixed rate signals FSr multiplexed in the reception frame FRr_1. As explained above, a redundant fixed rate signal is likely to be discarded by the opposing device (Step S11).

Therefore, the multiplex control unit 24 reduces the transmission multiplex number MNt so as to equalize the transmission multiplex number MNt to the reception multiplex number MNr (Step S3). Then, the multiplex control unit 24 notifies the multiplex unit 23 of the updated transmission multiplex number MNt. The multiplex unit 23 multiplexes the fixed rate signals FSt in a frame FRt_2 to be transmitted next according to the updated transmission multiplex number MNt.

Thus, as shown in FIG. 6, the number of the fixed rate signals FSt multiplexed in the transmission frame FRt_2 is equalized to the number of the fixed rate signals FSr multiplexed in a frame FRr_2 that is received next from the opposing device.

Moreover, the multiplex unit 23 allocates a vacant region in the payload region 102 generated by the reduction in the transmission multiplex number MNt to multiplexing of the transmission variable rate signal VSt (Step S4).

This makes it possible to improve transmission efficiency of the variable rate signal, thereby optimizing efficiency of data transmission in a wireless transmission band.

Figure 7:
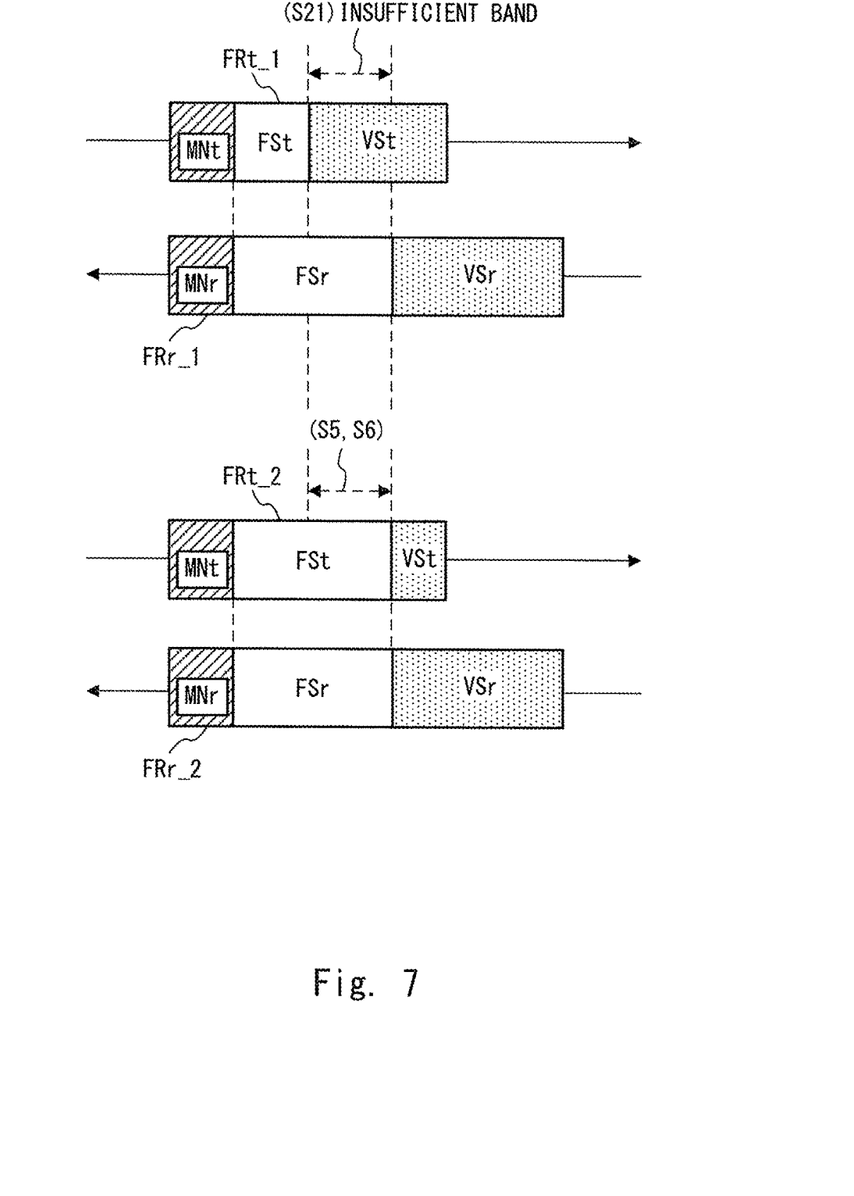
FIG. 7 is a third data transmission example in the wireless transmission device according to the first exemplary embodiment of the present invention.

On the other hand, in the above Step S2, when "the transmission multiplex number MNt<the reception multiplex number MNr" is satisfied, that is, as shown in FIG. 7, when a transmission band for the fixed rate signals FSt in the transmission frame FRt_1 is insufficient relative to a transmission band for the fixed rate signals FSr in the reception frame FRr_1 (Step S21), the multiplex control unit 24 increases the transmission multiplex number MNt to be equalized to the reception multiplex number MNr to thereby reduce the transmission band for the transmission variable rate signals VSt (Step S5).

Then, the multiplex control unit 24 notifies the multiplex unit 23 of the updated transmission multiplex number MNt. The multiplex unit 23 allocates a vacant region in the payload region 102 generated by the reduction in the transmission band for the transmission variable rate signal VSt to multiplexing of the fixed rate signals FSt (Step S6).

Thus, as shown in FIG. 7, the number of the fixed rate signals FSt multiplexed in the transmission frame FRt_2 is equalized to the number of the fixed rate signals FSr multiplexed in the reception frame FRr_2.

Second Exemplary Embodiment

A wireless transmission system according to this exemplary embodiment can be configured in a similar manner to the above first exemplary embodiment. Meanwhile, a wireless transmission device according to this exemplary embodiment differs from that in the above-mentioned first exemplary embodiment in that the wireless transmission device is configured as shown in FIG. 8.

Figure 8:
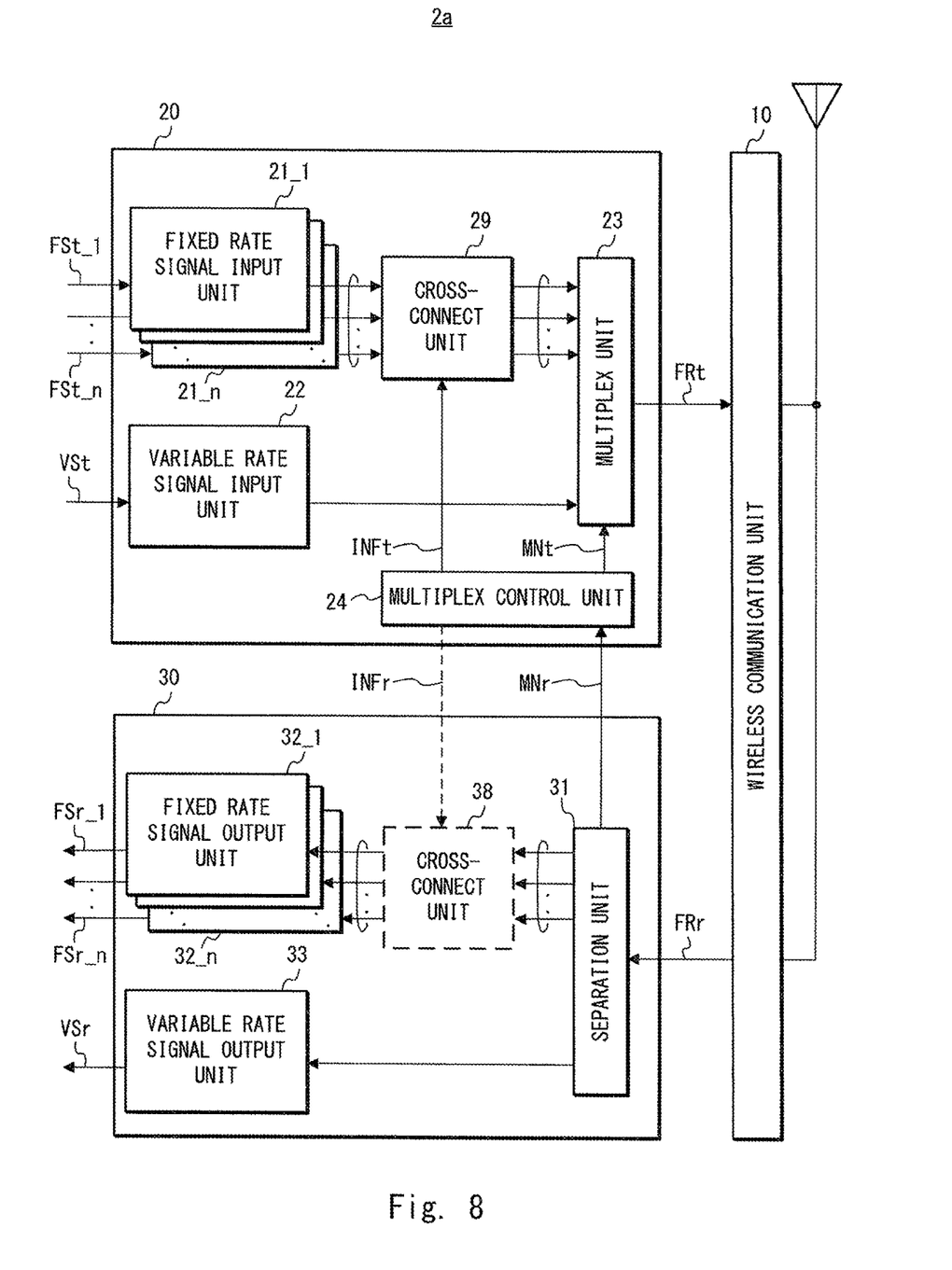
FIG. 8 is a block diagram showing a configuration example of a wireless transmission device according to a second exemplary embodiment of the present invention.

Specifically, in a wireless transmission device 2a shown in FIG. 8, a cross-connect unit 29 is further provided in the wireless frame multiplex unit 20. The cross-connect unit 29 performs cross-connect processing for transmission fixed rate signals FSt_1 to FSt_n, which are respectively read out from the fixed rate signal input units 21_1 to 21_n, according to transmission cross-connect information INFt that is input from the multiplex control unit 24, and outputs the transmission fixed rate signals FSt_1 to FSt_n to the multiplex unit 23.

Priorities of the respective transmission fixed rate signals FSt_1 to FSt_n are set to the transmission cross-connect information INFt. The cross-connect unit 29 reads higher-priority transmission fixed rate signals preferentially to other transmission fixed rate signals, and transfers the read fixed rate signals to the multiplex unit 23.

Thus, even when the multiplex unit 23 multiplexes the fixed rate signals FSt for the number indicated by the transmission multiplex number information MNt in the transmission frame FRt in ascending or descending order of the signal numbers "1" to "n" as explained in the above first exemplary embodiment, it is possible to guarantee a band for the higher-priority fixed rate signals.

In addition, in this exemplary embodiment, a cross-connect unit 38 may further be provided in the wireless frame separation unit 30, as indicated by the dotted line in FIG. 8. In such a case, the cross-connect unit 38 performs cross-connect processing for the reception fixed rate signals FSr_1 to FSr_n according to reception cross-connect information INFr that is input from the multiplex control unit 24. Specifically, output destinations of the respective reception fixed rate signals FSr_1 to FSr_n are set to the reception cross-connect information INFr. The cross-connect unit 38 transfers the reception fixed rate signals FSr to appropriate fixed rate signal output units according to this setting.

Note that it is obvious that the present invention is not limited to the above exemplary embodiments but various modifications can be made by a person skilled in the art based on description in the claims.

The present application claims priority rights of and is based on Japanese Patent Application No. 2011-122042 filed on May 31, 2011 in the Japanese Patent Office, the entire contents of which are hereby incorporated by reference.

INDUSTRIAL APPLICABILITY

The present invention is applied to a wireless transmission device, a wireless transmission system, and a method for controlling a wireless transmission device, and particularly to usage of multiplexing fixed rate signals and a variable rate signal in one wireless transmission band to be transmitted.

The whole or part of the exemplary embodiments disclosed above can be described as, but not limited to, the following supplementary notes.

(Supplementary Note 1)

A wireless transmission device comprising:

communication means employing an adaptive modulation scheme for sending a first frame to an opposing device through a first wireless transmission path, and receiving a second frame from the opposing device through a second wireless transmission path, the second wireless transmission path having a frequency different from the first wireless transmission path; and multiplex means for multiplexing a plurality of first data signals and a second data signal to generate the first frame, the first data signals being input in parallel at a fixed rate, and the second data signal being input at a variable rate, wherein the multiplex means includes, in the first frame, information relating to a number of multiplexed first data signals.

(Supplementary Note 2)

The wireless transmission device according to Supplementary note 1, further comprising:

separation means for separating, from the second frame, a plurality of third data signals, a fourth data signal, and information relating to a number of multiplexed third data signals, the third data signals being input in parallel to the opposing device at a fixed rate, and the fourth data signal being input to the opposing device at a variable rate, wherein the multiplex means determines the number of multiplexed first data signals according to the number of multiplexed third data signals.

(Supplementary Note 3)

The wireless transmission device according to Supplementary note 2, wherein the multiplex means equalizes the number of multiplexed first data signals to the number of multiplexed third data signals.

(Supplementary Note 4)

The wireless transmission device according to Supplementary note 2 or 3, wherein when the multiplex means determines to reduce the number of multiplexed first data signals, the multiplex means allocates a vacant region in the first frame generated by reduction to multiplexing of the second data signal.

(Supplementary Note 5)

The wireless transmission device according to any one of Supplementary notes 1 to 4, wherein the multiplex means selects a data signal to be multiplexed in the first frame from the first data signals according to priorities of the first data signals.

(Supplementary Note 6)

A wireless transmission device comprising:

communication means employing an adaptive modulation scheme for receiving a first frame from an opposing device through a first wireless transmission path, and sending a second frame to the opposing device through a second wireless transmission path, the second wireless transmission path having a frequency different from the first wireless transmission path;

separation means for separating, from the first frame, a plurality of first data signals, a second data signal, and information relating to a number of multiplexed first data signals, the first data signals being input in parallel to the opposing device at a fixed rate, and the second data signal being input to the opposing device at a variable rate; and multiplex means for multiplexing a plurality of third data signals and a fourth data signal to generate the second frame, the third data signals being input in parallel to the wireless transmission device at a fixed rate, and the fourth data signal being input to the wireless transmission device at a variable rate, wherein the multiplex means determines a number of multiplexed third data signals according to the number of multiplexed first data signals.

(Supplementary Note 7)

The wireless transmission device according to Supplementary note 6, wherein the multiplex means equalizes the number of multiplexed third data signals to the number of multiplexed first data signals.

(Supplementary Note 8)

The wireless transmission device according to Supplementary note 6 or 7, wherein when the multiplex means determines to reduce the number of multiplexed third data signals, the multiplex means allocates a vacant region in the second frame generated by reduction to multiplexing of the fourth data signal.

(Supplementary Note 9)

A wireless transmission system comprising:

a first wireless transmission device employing an adaptive modulation scheme that sends a first frame through a first wireless transmission path and receives a second frame through a second wireless transmission path, the second wireless transmission path having a frequency different from the first wireless transmission path; and a second wireless transmission device employing the adaptive modulation scheme that receives the first frame from the first wireless transmission device through the first wireless transmission path and transmits the second frame to the first wireless transmission device through the second wireless transmission path, wherein the first wireless transmission device is configured to:

multiplex a plurality of first data signals and a second data signal to generate the first frame, the first data signals being input in parallel to the first wireless transmission device at a fixed rate, and the second data signal being input to the first wireless transmission device at a variable rate; and include, in the first frame, information relating to a number of multiplexed first data signals, wherein the second wireless transmission device is configured to:

separate, from the first frame, the first data signals, the second data signal, and the information relating to the number of multiplexed first data signals;

multiplex a plurality of third data signals and a fourth data signal to generate the second frame, the third data signals being input in parallel to the second wireless transmission device at a fixed rate, and the fourth data signal being input to the second wireless transmission device at a variable rate; and determine a number of multiplexed third data signals according to the number of multiplexed first data signals.

(Supplementary Note 10)

A method for controlling a wireless transmission device employing an adaptive modulation scheme, the wireless transmission device sending a first frame to an opposing device through a first wireless transmission path and receiving a second frame from the opposing device through a second wireless transmission path, the second wireless transmission path having a frequency different from the first wireless transmission path, the method comprising:

multiplexing a plurality of first data signals and a second data signal to generate the first frame, the first data signals being input in parallel at a fixed rate, and the second data signal being input at a variable rate; and including, in the first frame, information relating to a number of multiplexed first data signals.

(Supplementary Note 11)

The method according to Supplementary note 10, further comprising:

separating, from the second frame, a plurality of third data signals, a fourth data signal, and information relating to a number of multiplexed third data signals, the third data signals being input in parallel to the opposing device at a fixed rate, and the fourth data signal being input to the opposing device at a variable rate, wherein the number of multiplexed first data signals is determined according to the number of multiplexed third data signals.

(Supplementary Note 12)

The method according to Supplementary note 11, wherein the number of multiplexed first data signals is equalized to the number of multiplexed third data signals.

(Supplementary Note 13)

The method according to Supplementary note 11 or 12, further comprising:

allocating, when it is determined to reduce the number of multiplexed first data signals, a vacant region in the first frame generated by reduction to multiplexing of the second data signal.

(Supplementary Note 14)

The method according to any one of Supplementary notes 10 to 13, wherein a data signal to be multiplexed in the first frame is selected from the first data signals according to priorities of the first data signals.

(Supplementary Note 15)

A method for controlling a wireless transmission device employing an adaptive modulation scheme, the wireless transmission device receiving a first frame from an opposing device through a first wireless transmission path and transmitting a second frame to the opposing device through a second wireless transmission path, the second wireless transmission path having a frequency different from the first wireless transmission path, the method comprising:

separating, from the first frame, a plurality of first data signals, a second signal, and information relating to a number of multiplexed first data signals, the first data signals being input in parallel to the opposing device at a fixed rate, and the second data signal being input to the opposing device at a variable rate;

multiplexing a plurality of third data signals and a fourth data signal to generate the second frame, the third data signals being input in parallel to the wireless transmission device at a fixed rate, and the fourth data signal being input to the wireless transmission device at a variable rate; and determining a number of multiplexed third data signals according to the number of multiplexed first data signals.

(Supplementary Note 16)

The method according to Supplementary note 15, wherein the number of multiplexed third data signals is equalized to the number of multiplexed first data signals.

(Supplementary Note 17)

The method according to Supplementary note 15 or 16, further comprising:

allocating, when it is determined to reduce the number of multiplexed third data signals, a vacant region in the second frame generated by reduction to multiplexing of the fourth data signal.

REFERENCE SIGNS LIST

1 WIRELESS TRANSMISSION SYSTEM
2, 2_1, 2_2, 2a WIRELESS TRANSMISSION DEVICE
10 WIRELESS COMMUNICATION UNIT
11 ANTENNA
12 ADAPTIVE MODULATION CONTROL UNIT
20 WIRELESS FRAME MULTIPLEX UNIT
21_1-21_n FIXED RATE SIGNAL INPUT UNIT
22 VARIABLE RATE SIGNAL INPUT UNIT
23 MULTIPLEX UNIT
24 MULTIPLEX CONTROL UNIT
25, 27 INPUT TERMINAL
26, 28 TRANSMISSION BUFFER
29, 38 CROSS-CONNECT UNIT
30 WIRELESS FRAME SEPERATION UNIT
31 SEPARATION UNIT
32_1-32_n FIXED RATE SIGNAL OUTPUT UNIT
33 VARIABLE RATE SIGNAL OUTPUT UNIT
34, 36 RECEPTION BUFFER
35, 37 OUTPUT TERMINAL
101 OVERHEAD REGION
102 PAYLOAD REGION
CH1, CH2 WIRELESS TRANSMISSION PATH
FR, FR1, FR2 WIRELESS FRAME
FRr, FRr_1, FRr_2 RECEPTION FRAME
FRt, FRt_1, FRt_2 TRANSMISSION FRAME
FS, FS1_1-FS1_n, FS3_1-FS3_n FIXED RATE SIGNAL
FSr, FSr_1-FSr_n RECEPTION FIXED RATE SIGNAL
FSt, FSt_1-FSt_n TRANSMISSION FIXED RATE SIGNAL

INFr RECEPTION CROSS-CONNECT INFORMATION
INFt TRANSMISSION CROSS-CONNECT INFORMATION
MN MULTIPLEXING NUMBER (INFORMATION)
MNr RECEPTION MULTIPLEXING NUMBER (INFORMATION)
nMNt TRANSMISSION MULTIPLEXING NUMBER (INFORMATION)
VS, VS2, VS4 VARIABLE RATE SIGNAL
VSr RECEPTION VARIABLE RATE SIGNAL
VSt TRANSMISSION VARIABLE RATE SIGNAL

The invention claimed is:

1. A wireless transmission device comprising:
a transceiver employing an adaptive modulation scheme that sends a first frame to an opposing device through a first wireless transmission path for transmission from the wireless transmission device to the opposing device, and receives a second frame from the opposing device through a second wireless transmission path for transmission from the opposing device to the wireless transmission device, the second wireless transmission path having a frequency different from the first wireless transmission path; and
a multiplexer that multiplexes a plurality of first data signals and a second data signal to generate the first frame, the first data signals being input in parallel at a fixed rate, and the second data signal being input at a variable rate; and
a signal separator that separates, from the second frame, a plurality of third data signals, a fourth data signal, and information relating to a number of multiplexed third data signals, the third data signals being input in parallel to the opposing device at a fixed rate, and the fourth data signal being input to the opposing device at a variable rate,
wherein the multiplexer includes, in the first frame, information relating to a number of multiplexed first data signals,
wherein the multiplexer determines the number of multiplexed first data signals according to the number of multiplexed third data signals,
wherein when the multiplexer determines to reduce the number of multiplexed first data signals, the multiplexer allocates a vacant region in the first frame generated by reduction to multiplexing of the second data signal.

2. The wireless transmission device according to claim 1, wherein the multiplexer equalizes the number of multiplexed first data signals to the number of multiplexed third data signals.

3. The wireless transmission device according to claim 1, wherein the multiplexer selects a data signal to be multiplexed in the first frame from the first data signals according to priorities of the first data signals.

4. A wireless transmission system comprising:
a first wireless transmission device; and
a second wireless transmission device,
wherein the first wireless transmission device comprises:
a first transceiver employing an adaptive modulation scheme that sends a first frame through a first wireless transmission path from the first wireless transmission device to the second wireless transmission device and receives a second frame through a second wireless transmission path from the second wireless transmission device to the first wireless transmission device, the second wireless transmission path having a frequency different from the first wireless transmission path; and a first multiplexer that multiplexes a plurality of first data signals and a second data signal to generate the first frame, the first data signals being input in parallel to the first wireless transmission device at a fixed rate, and the second data signal being input to the first wireless transmission device at a variable rate, and includes, in the first frame, information relating to a number of multiplexed first data signals, wherein the second wireless transmission device comprises:

a second transceiver employing the adaptive modulation scheme that receives the first frame from the first wireless transmission device through the first wireless transmission path and transmits the second frame to the first wireless transmission device through the second wireless transmission path, a signal separator that separates, from the first frame, the first data signals, the second data signal, and the information relating to the number of multiplexed first data signals; and a second multiplexer that multiplexes a plurality of third data signals and a fourth data signal to generate the second frame, the third data signals being input in parallel to the second wireless transmission device at a fixed rate, and the fourth data signal being input to the second wireless transmission device at a variable rate, and determines a number of multiplexed third data signals according to the number of multiplexed first data signals, and wherein when the second multiplexer of the second wireless transmission device determines to reduce the number of multiplexed third data signals, the second multiplexer allocates a vacant region in the second frame generated by reduction to multiplexing of the fourth data signal.

5. A method for controlling a wireless transmission device employing an adaptive modulation scheme, the wireless transmission device sending a first frame to an opposing device through a first wireless transmission path and receiving a second frame from the opposing device through a second wireless transmission path, the second wireless transmission path having a frequency different from the first wireless transmission path, the method comprising:

multiplexing a plurality of first data signals and a second data signal to generate the first frame, the first data signals being input in parallel at a fixed rate, and the second data signal being input at a variable rate;

including, in the first frame, information relating to a number of multiplexed first data signals; and separating, from the second frame, a plurality of third data signals, a fourth data signal, and information relating to a number of multiplexed third data signals, the third data signals being input in parallel to the opposing device at a fixed rate, and the fourth data signal being input to the opposing device at a variable rate, allocating, when it is determined to reduce the number of multiplexed first data signals, a vacant region in the first frame generated by reduction to multiplexing of the second data signal, wherein the number of multiplexed first data signals is determined according to the number of multiplexed third data signals.

6. The method according to claim 5, wherein the number of multiplexed first data signals is equalized to the number of multiplexed third data signals.

7. The method according to claim 5, wherein a data signal to be multiplexed in the first frame is selected from the first data signals according to priorities of the first data signals.

* * * * *